July 29, 1930. S. ISHISAKA 1,771,680
APPARATUS FOR ELECTROPLATING
Filed March 29, 1927
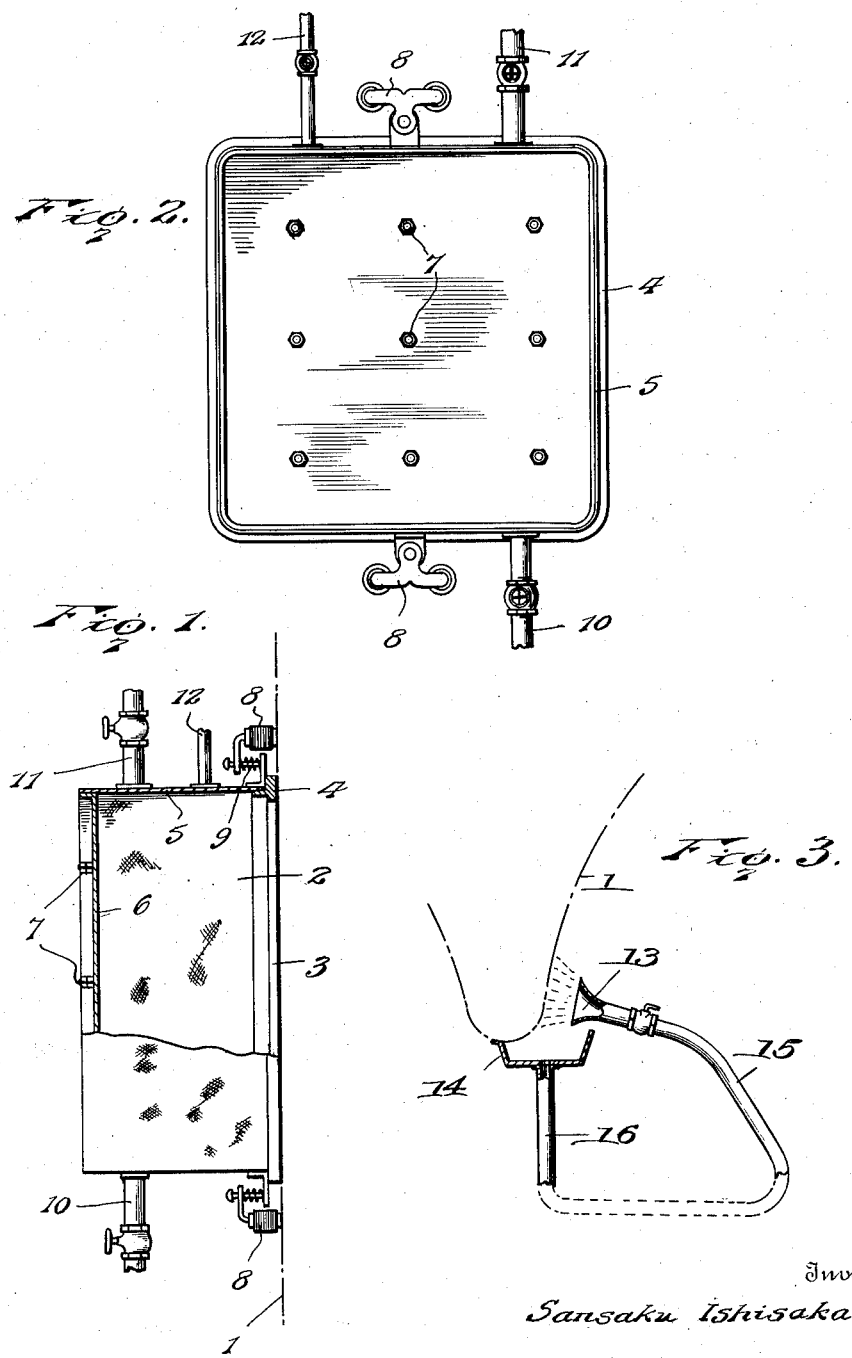
Inventor
Sansaku Ishisaka
By Lacy & Lacy, Attorneys Patented July 29, 1930

1,771,680

UNITED STATES PATENT OFFICE

SANSAKU ISHISAKA, OF TAKASAKI, JAPAN

APPARATUS FOR ELECTROPLATING

Application filed March 29, 1927. Serial No. 179,327.

The present invention relates to method and apparatus for electroplating, more particularly with chrome, and provides means by which an electrolytic solution of chrome is brought into contact with the surface of the metallic object to be plated, the electric current being passed through the solution with the said metallic object as the negative pole.

According to the present invention the object to be plated is held stationary instead of being placed within the electrolytic solution and the solution is applied to and moved over the surface of the object, while the electric current is passed through the solution with the object serving as a negative pole. Thus the special purpose of the present invention is to make possible the elecroplating of metal bodies of huge size which cannot be practically placed within the electrolytic solution.

In the accompanying drawings, which illustrate practical embodiments of the invention, Fig. 1 is a sectional elevation of an apparatus for practicing the invention, Fig. 2 a front view of the same, and Fig. 3 an elevation of a modification.

Referring to the drawings, (1) indicates an iron plate or wall constituting the outer surface of a ship, and (2) a receptacle constructed in accordance with the present invention by means of which an electrolytic solution of chrome is brought into contact with the surface of the iron plate. The side (3) of said receptacle is open, and provided around its rim with a gasket 4 of rubber or other suitable compressible material which will form a seal against leakage when the receptacle is applied to the plate; and the four side walls (5) of the receptacle are of flexible material, such as cotton canvas made water and acid proof by coating with rubber, by this construction permitting the receptacle to conform easily to the curvature or irregular contour of the surface of the plate or the elements by which it is secured in place. The wall (6) of the receptacle, opposite the open side is made of lead plate, and provided with lead terminals or binding posts 7 which with the wall 6 provide an anode having an area substantially equal to the area to be plated and the whole receptacle is acid proof. The receptacle is maintained in position on the plate by magnets 8 attached to the receptacle by shock-absorbing connections 9, the attraction between the plate and the magnets holding the receptacle tightly upon the part which is to be plated.

The operation of the present apparatus is as follows: The receptacle (2) is maintained by the magnets (8) with the open side (3) against the plate with the gasket (4) compressed about the part of the iron plate (1) which is to be plated with chrome layer; then the electrolytic solution of chrome stored in a suitable reservoir is pumped up through pipe (10) into the receptacle (2) and discharged through pipe (11), the electrolyte being thus kept in circulation between the reservoir and the receptacle. During this circulation of the electrolyte with the lead terminals (7) as positive poles and with the iron plate (1) as a negative pole free chrome is deposited upon the surface of the iron plate. As the hydrogen produced by electrolysis near the surface of the iron plate, if it be stored inside of the receptacle, damages the electrolyte, it is advantageously discharged through pipe (12) as it is formed. For practical good operation it is noted that the distance between the lead wall and terminals 6 and 7 and the iron plate, in other words, between positive and negative poles is from 5 to 7 inches, the temperature of the electrolyte is at from 40 degrees to 50 degrees C., and the electric current is at 7 volts and 100 amperes per square foot. Under such conditions, the operation is continued for from one hour to 4 hours, according to the thickness desired for the plating and the chrome layer applied on the ship body may be advantageously applied at desired points on the ship's bottom.

In Fig. 3, illustrating a modified apparatus for carrying out the present invention, (1) is iron plate of the ship's bottom, (13) a sprayer, and (14) a receiver. The electrolytic solution of chrome stored in a suitable reservoir is pumped up through pipe (15) and sprayed out upon the iron plate through the sprayer (13), the excess sprayed solution dropping into the receiver (14) and being returned through pipe (16) into the reservoir so that the solution is circulated through the reservoir the sprayer, the receiver, and again the reservoir. During this circulation of solution, the electric current is passed through the circuit consisting of sprayer, sprayed electrolytic solution, and iron plate, with the iron plate as negative pole and with the sprayer as positive one, so that the said solution is decomposed and chrome is deposited upon the surface of the iron plate, and thus after a certain time of operation chrome layer of certain thickness may be coated upon the iron plate. This arrangement is especially suitable for smaller parts to be plated due to the fact that a sprayer of any size may be selected and applied at any smaller parts such as the nailed part, curved part and so on, and moreover especially suitable for repairing a damaged spot of a previously plated object.

According to the present invention the receptacle (2) or the sprayer (13) is successively applied to several spots to be plated, this shifting being made, in the case of employing the receptacle (2), either without discharging the solution from the receptacle or after the solution is entirely discharged, and thus an object of any huge size may be easily coated with a metallic layer. It is to be noted that while the magnets 8 will hold the receptacle closely to the surface to be placed, they will yield sufficiently to permit the receptacle to be moved over the object while maintaining contact therewith.

Among the metals to be plated according to the present invention it is found that chrome, which undergoes no general chemical nor physical changes at average atmospheric temperature, is best suited for the purpose.

Having now particularly described and ascertained the nature of our said invention and in what manner the same is performed, I declare that what I claim is:

Apparatus for the purpose set forth comprising a receptacle having flexible walls, an open front and a rigid back, an inlet for an electrolyte on one side, an outlet for electrolyte on the opposite side, an outlet for generating gas, conductor terminals on the rigid back, electro-magnets, and yieldable connections between the electro-magnets and the sides of the receptacle whereby the magnets will support the receptacle upon work and will yield to extraneous force to permit shifting of the receptacle.

In testimony whereof I hereunto affix my signature.

SANSAKU ISHISAKA